Patented Dec. 19, 1944

2,365,464

UNITED STATES PATENT OFFICE 2,365,464

PREPARATION OF PHTHALOCYANINE PIGMENTS

Peter Fredrick Gross, Woodstown, N. J., assignor to E. I. du Pont de Nemours & Company, Wilmington, Del., a corporation of Delaware No Drawing. Application April 7, 1942, Serial No. 438,003

6 Claims. (Cl. 260—314.5)

This invention relates to the preparation of phthalocyanine pigments of improved properties. More particularly it relates to the recovery of copper-phthalocyanine or other pigments of the phthalocyanine series in a novel crystalline form, in combination with sulfuric acid, which renders the same readily filterable, washable and convertible into the respective free phthalocyanine compound in a state of high purity.

It is already known in the prior art to purify copper-phthalocyanine by converting it into a sulfate, filtering off the impurities, and reconverting the sulfate into free copper-phthalocyanine. One such process is described and claimed in copending application Serial No. 301,171 by S. R. Detrick and R. T. Diver (Patent No. 2,284,685, issued June 2, 1942), wherein conversion of copper-phthalocyanine into the sulfate was effected by dissolving the color in concentrated sulfuric acid (98–100%) and diluting gradually to a concentration of 90% or less, while keeping the temperature below 30° C. Other procedures are described in U. S. Patent No. 2,225,302 and Br. Patent No. 502,623. In all of these procedures, the temperature of the diluted sulfuric acid is kept low (0–30° C.) during the dilution step or during the incorporation of the color. The result is that the sulfate is separated, almost instantly, in the form of microscopic needles.

Now, I have found that by modifying the procedure somewhat, as hereinafter more fully set forth, it is possible to obtain the sulfate of the phthalocyanine compound in the form of rectangular, box-like, in other words, prismatic, crystals, which are much larger than the crystals obtained by the prior processes. The exact size of the box-like crystals varies considerably with each coloring matter and again within each batch, but the bulk of the material is in the form of crystals which in the case of copper-phthalocyanine are at least 1000 times and more often 20,000 times as great in volume as the average volume of the needle-like crystals obtainable by the prior processes. As a result, the product of this invention filters much more readily, is easier to wash clean, and when reconverted into the pigment, gives a color of superior brilliance and tinctorial strength than the products of the prior art.

Accordingly, this invention has as its object the preparation of phthalocyanine pigments of superior properties as compared with the pigments obtained by the processes of the prior art. More particularly it is an object of this invention to prepare phthalocyanine coloring matters of a high state of purity, resulting in improved brilliance and tinctorial strength. Another object is to develop an improved process for purifying copper-phthalocyanine more readily operable on a manufacturing scale.

The objects of this invention are attained by dissolving the impure phthalocyanine pigment in sulfuric acid of concentration of about 90% and at a temperature of about 70° to about 110° C. then cooling rapidly to a temperature of about −10° to +30° C. This causes the crystallization of a sulfate of the phthalocyanine. In the case of copper-phthalocyanine, the product has the form of roughly rectangular plate-shaped or box-shaped crystals, of a size ranging from 0.03 mm. to 0.25 mm. in each dimension, and may be filtered on an acid-resistant filter with great facility. The crystalline cake after washing with cold sulfuric acid of about 90% concentration is then re-dissolved in sulfuric acid of 98% concentration or stronger at room temperature or below, then drowned in water by methods well known in the art. Alternatively, the crystalline cake may be treated with water to cause hydrolysis of the sulfate with the formation of the free phthalocyanine, which may be filtered, washed acid-free, and dried, then finished by known methods.

The process of my invention differs from the processes of the art mainly in the fact that solution of the color and precipitation of the sulfate are effected in sulfuric acid of substantially the same strength, solution and precipitation being controlled by changes in temperature rather than by changes in concentration. It seems that this factor has a material influence on the crystal form and size obtained.

It may even be that the chemical constitution of the precipitated color is not the same as in the prior art, being probably still a sulfate, but perhaps of a different number of $H_2SO_4$ units per phthalocyanine molecule.

The process of this invention appears to be applicable to any phthalocyanine compound which is insoluble in water and which is sufficiently stable in sulfuric acid to be capable of dissolving in sulfuric acid of 90% concentration at a temperature of about 95° C. without decomposition. Consequently, this process is applicable to copper-phthalocyanine, cobalt-phthalocyanine, nickel-phthalocyanine, their monohalogen derivatives, chloraluminum-phthalocyanine, and the phthalocyanines of other metals which do not lose their central metal atom upon being treated with concentrated sulfuric acid.

If desired, where the color is synthesized in the presence of an organic diluent, such as dichlorobenzene, which is insoluble in sulfuric acid and inert toward 90% H₂SO₄ at about 95° C., my invention may be worked in such a manner as to effect simultaneously a separation of the color from the diluent, thus obviating the necessity of interposing a special separation step such as distilling off or washing out the diluent, and drying the color. In such event, the procedure according to my invention would be to treat the reaction mass directly (or, if desired, after removal of part of the diluent by filtration) with sulfuric acid of 85 to 95% strength at a temperature between 70 and 110° C. The sulfuric acid extracts the color from the reaction mass, leaving the organic diluent in the form of a readily separable layer, which may be removed at one's convenience before, during or after the step of cooling.

Without limiting this invention to any particular procedure, the following examples are given to illustrate my preferred mode of operation. Parts mentioned are by weight.

Example 1

100 parts of crude copper-phthalocyanine, prepared by the urea process according to U. S. Patent No. 2,214,477, and containing approximately 87% of the pure color following a preliminary extraction with dilute sulfuric acid (about 2%), were added slowly, with agitation, to 1300 parts of 90% sulfuric acid at a temperature of 90 to 95° C. The mixture was agitated at this temperature until all the color was dissolved, forming a clear dark green solution. Then the solution was cooled as quickly as possible to 0° C. by means of an external freezing mixture of ice and salt. This may require 15 to 45 minutes. After agitating at −10 to 0° C. for 1 hour to complete crystallization, the slurry was filtered on an acid-resistant filter. Filtration was very rapid. The filter cake was washed with 100 parts of cold 90% sulfuric acid. The product when examined under the microscope was found to consist of greenish black crystals, box-like in shape and with sizes ranging from 0.03 to 0.25 mm. in length. The width and thickness of each crystal was about 0.5 to 1.0 times its length, giving to each a computed volume ranging from about 0.00002 cubic mm. for the smallest sizes to about 0.01 cubic mm. for the largest sizes. The average crystal was of course of an intermediate size, and was probably closer to 0.07–0.1 mm. in the longest dimension.

A portion of the filter cake was then dumped into a large quantity of water, to regenerate the pure color, and the latter was filtered off, washed acid-free and dried. The dry crystalline product was found to contain 10.94% copper, corresponding to a purity of 99%.

The remainder of the filter cake was then added to 645 parts of 100% sulfuric acid and agitated at 10 to 15° C. until the color was all dissolved. The solution was drowned in water by the process of the copending patent application of Detrick and Brandt, Serial No. 320,418 (Patent No. 2,334,812, issued November 23, 1943), and upon isolation gave a product of exceptional brilliance and tinctorial strength.

Example 2

100 parts of crude nickel-phthalocyanine, prepared by the urea process according to U. S. Patent No. 2,214,477 and which had been rid of dilute-acid-soluble impurities by preliminary extraction as in Example 1, were added during about one hour to 1500 parts of 90% sulfuric acid at 90–95° C. and stirred at that temperature until completely dissolved. The solution then was cooled as rapidly as possible in an ice-salt bath to 0° C. and held at −5 to 0° for one-half hour. The crystalline product was filtered on an acid resistant filter and washed with 100 parts of 90% sulfuric acid.

The filter cake was then added to 850 parts of oleum containing 3.7% free SO₃, and the mixture agitated for about 2.5 hours, whereupon the color was all in solution. The pigment was then thrown out of solution by drowning in water by the process used in Example 1, giving upon isolation nickel-phthalocyanine of a high degree of purity.

Example 3

Phthalonitrile, cuprous chloride and pyridine were reacted together in o-dichloro-benzene according to Example 6 of Br. Patent No. 459,780 and the reaction mass was filtered to remove the bulk of the solvent. 122 parts of the remaining filter cake were added directly, in small portions and with slow agitation, to 900 parts of 90% sulfuric acid at 100–110° C. The pigment dissolved in the acid and the dichlorobenzene remained on top as a clear, sharply defined, liquid layer. The mixture was agitated gently at this temperature for one-half hour longer to insure complete solution. The two layers were then separated, and the acid layer was cooled rapidly in an ice-salt mixture to about 5 to 10° C. and held at that temperature for 30 minutes. The copper-phthalocyanine crystallized out in the form of box-shaped crystals of the sulfate as described in Example 1. These were filtered on an acid resistant filter and washed with about 100 parts of cold 90% H₂SO₄. The cake was slurried in cold water, filtered and washed acid-free. Residual copper salts were removed by washing with dilute aqueous ammonia, then the cake was washed ammonia-free and dried. Analysis showed 10.68% Cu.

Example 4

Twenty parts of dry crude cobalt-phthalocyanine, prepared by the reaction between urea, phthalic anhydride, and cobaltous chloride in the presence of boric acid and ammonium molybdate, were added to 255 parts of 90.7% sulfuric acid at 80° to 85° C. and agitated at this temperature until the color was completely dissolved. The solution was cooled rapidly to 0° to 10° C. by means of an external bath of ice and salt. The sulfate of cobalt-phthalocyanine separated from solution in the form of prismatic crystals measuring from 0.02 to 0.05 mm. in length. The product was filtered on an acid-resistant filter and washed with four portions of about 100 parts each of cold 90% H₂SO₄. The filter cake then was dissolved in 73 parts of 100% H₂SO₄ at 10° to 20° C. and the solution was drowned in 200 parts of water at 90° to 95° C. The precipitated color was filtered, washed acid-free, washed with dilute ammonia water, washed alkali-free and dried. The purified cobalt phthalocyanine had an analysis of 9.99% cobalt and 19.43% nitrogen. The calculated percentages of cobalt and nitrogen in cobalt-phthalocyanine are 10.31% and 19.62%, respectively.

Example 5

100 parts of crude chlor-aluminum-phthalocyanine, which was prepared by heating together phthalonitrile, aluminum chloride and sodium sulfate at 200–280° C. for 1.5 hours followed by extraction with water and drying, were added to 2000 parts of 90% $H_2SO_4$ at 100 to 110° C. The mixture was held at this temperature until a clear solution was obtained. This then was cooled as rapidly as possible by means of an external bath of ice and salt to a temperature of 0° to 10° C. and held for 40 minutes. The product separated from solution in the form of box-like crystals approximately 0.01 mm. in length. These were filtered off on an acid-resistant filter and washed with cold 90% $H_2SO_4$. The filter cake was slurried in 500 to 600 parts of water, filtered and washed until free from acid. This gave, after drying 68 parts of purified hydroxy-aluminum-phthalocyanine analyzing 4.97% aluminum.

It will be understood that the above examples are merely illustrative, and that many variations in the details thereof may be practiced without departing from the spirit of this invention.

Thus, the temperature of the acid during the step of solution may vary between 70 and 110° C.; the preferred range in the case of copper-phthalocyanine being about 90 to 95° C. The concentration of the acid may vary from about 83 to about 95%, the preferred range in the case of copper-phthalocyanine being about 90%. Of course, enough of the acid should be used to dissolve all the color, but undue excesses are to be avoided.

The temperature of the crystallization step should be below 30° C., and may be even below −10° C., but it should not be so low as to freeze the acid. The preferred range in the case of copper-phthalocyanine is about 0 to 10° C. The rate of cooling seems to be an important factor, better crystals being obtained under rapid cooling conditions. This factor, however, will generally be limited by the available equipment and will usually fall somewhere between 10 minutes and one hour.

The method is applicable to all metallic phthalocyanines which are known not to lose their metal by treatment with strong sulfuric acid. These include copper, zinc, aluminum, cerium, zirconium, vanadium, chromium, molybdenum, iron, cobalt, nickel, palladium, and platinum phthalocyanines. Partially chlorinated phthalocyanines, such as monochloro-copper-phthalocyanine also may be purified by this invention.

The method of addition may be varied from the procedure described in the examples. For instance, instead of adding the crude pigment to the hot acid, it is equally satisfactory to add the color to the cold acid, then raise the temperature until solution is complete. It is also possible to adjust the concentration of acid to the desired percentage in the presence of the undissolved crude pigment by adding either water or concentrated sulfuric acid as required. For example, where it is desired to purify crude pigment which is wet with water, the proper quantity of oleum or of $H_2SO_4$ of higher than 90% strength may be used so as to give a final acid concentration of 90%.

Where the pigment to be purified contains grit or other solid impurities insoluble in hot sulfuric acid, these may be removed by filtration just before the solution is cooled.

In Example 3 there is described in detail the removal of o-dichloro-benzene from crude copper-phthalocyanine. This invention also will serve to remove in a similar way other liquid impurities which are insoluble in and chemically inert to hot sulfuric acid of the concentration used. Examples of other types of such liquids are saturated aliphatic hydrocarbons and their halogen-substituted derivatives.

As has been pointed out, the success of this invention from a technical viewpoint is largely due to the unexpected formation of the large box-shaped crystals of copper-phthalocyanine sulfate. This is evidently either a heretofore-undiscovered compound of copper-phthalocyanine with sulfuric acid, which differs from the previously described compounds either in the number of molecules of sulfuric acid bound to the pigment molecule or in the arrangement in space of the sulfuric acid residues (isomerism), or a previously unknown crystal form of the addition compound described in the prior art. It has not been established, which of these possible explanations is the true one. However, it is definitely established that the process of this invention results in the formation of a new product, whose existence and favorable properties could not have been predicted from the prior art.

Among the numerous advantages of my invention the following are worthy of special note:

1. A striking reduction in the time of filtration of the crystalline addition product.
2. The retention of a much smaller quantity of the impurity-containing mother liquor in the filter cake.
3. A great improvement in the ease of washing the crystalline cake by reason of the sandy texture of the product.
4. Production of a final pigment of higher purity as a result of (2) and (3), than was possible by the processes of the prior art.
5. As a result of this improved purity, the final pigment is superior in strength and brightness of shade to that produced by the processes of the prior art.

I claim:

1. The process of preparing a crystalline sulfate of a water-insoluble phthalocyanine compound selected from the group of those water-insoluble phthalocyanine compounds which dissolve in 90% sulfuric acid at 95° C. without decomposition, which comprises dissolving the phthalocyanine compound in sulfuric acid of not less than 85% and not more than 95% concentration, by heating said coloring compound in said acid at a temperature between 70 and 110° C., precipitating the sulfate of said coloring compound by cooling the solution to below 30° C. by a heat-exchange process which does not result in dilution of the solution, and then separating the precipitated sulfate from the mother liquor.

2. In the process of converting a phthalocyanine compound into a sulfate thereof for the sake of purification, the phthalocyanine compound being a metal-phthalocyanine of the group which do not lose their central metal upon being treated with concentrated sulfuric acid, the improvement which consists of forming the sulfate by first dissolving the phthalocyanine compound in sulfuric acid of 87 to 91% strength at a temperature of about 90 to 95° C., and then cooling the solution rapidly, without dilution, to a temperature between 0 to 10° C.

3. In the process of converting copper-phthalocyanine into a sulfate thereof for the sake of purification, the improvement which consists of forming the sulfate by first dissolving the phthalocyanine compound in sulfuric acid of 87 to 91% strength at a temperature of about 90 to 95° C., and then cooling the solution rapidly, without dilution, to a temperature between 0 and 10° C.

4. In the process of converting cobalt-phthalocyanine into a sulfate thereof for the sake of purification, the improvement which consists of forming the sulfate by first dissolving the phthalocyanine compound in sulfuric acid of 87 to 91% strength at a temperature of about 90 to 95° C., and then cooling the solution rapidly, without dilution, to a temperature between 0 and 10° C.

5. In the process of converting nickel-phthalocyanine into a sulfate thereof for the sake of purification, the improvement which consists of forming the sulfate by first dissolving the phthalocyanine compound in sulfuric acid of 87 to 91% strength at a temperature of about 90 to 95° C., and then cooling the solution rapidly, without dilution, to a temperature between 0 and 10° C.

6. The process of recovering a phthalocyanine coloring matter from a reaction mass thereof containing the same in admixture with an organic liquid, the phthalocyanine coloring matter being selected from that group which is insoluble in water, soluble in sulfuric acid and sufficiently stable in the latter to be capable of dissolving in sulfuric acid of 90% strength at 95° C. without decomposition, and the organic liquid being one which is immiscible with sulfuric acid and inert toward 90% sulfuric acid at 95° C., which comprises mixing the reaction mass with sulfuric acid of a concentration between 85 and 95% at a temperature between 70 and 110° C., the quantity of acid employed being sufficient to dissolve all the color in the reaction mass, then subjecting the mixture in optical order to the following two steps, namely: the step of separating the sulfuric acid layer from the layer of immiscible organic liquid, and the step of cooling the sulfuric acid mass to a temperature below 30° C. by a heat-exchange process which does not result in dilution of the sulfuric acid mass to crystallize out the color in the form of a sulfate thereof; and eventually separating the crystalline sulfate from the mother liquor, and further treating the same to liberate the free color.

PETER FREDRICK GROSS.